UNITED STATES PATENT OFFICE.

MELVIN SHAW, OF ABINGTON, MASSACHUSETTS, ASSIGNOR, BY MESNE ASSIGNMENTS, TO BENJAMIN F. BROWN, TRUSTEE FOR THE SHAW LIQUID DRESSING ASSOCIATION.

IMPROVEMENT IN COMPOSITIONS FOR DRESSING LEATHER.

Specification forming part of Letters Patent No. 34,530, dated February 25, 1862; reissue No. 7,509, dated February 13, 1877; application filed May 18, 1876.

*To all whom it may concern:*

Be it known that I, MELVIN SHAW, of Abington, in the county of Plymouth and State of Massachusetts, have invented an Improved Upper-Leather Dressing, of which the following is a full, clear, and exact description and specification.

This dressing is designed to be used by curriers for finishing upper leather, and by manufacturers for blacking boots and shoes, the object being to produce thereby upon the surface of leather which has been already blackened in the usual manner a uniform, smooth, and glossy finish, which imparts to the leather a bright, lively, black color, without materially impairing its original softness and pliability.

The essential ingredients of this improved dressing are, first, an alkaline solution of shellac; and, second, a black dye or soluble coloring matter, producing a shade or tint of black, and capable of being held in the alkaline solution, without precipitating the shellac and without being itself decomposed by the alkali.

To these ingredients should be added a third, which, although not strictly essential, is nevertheless of great importance in insuring the best results, and which consists of a volatile alkali, added in excess of the quantity of alkali required to dissolve the shellac.

Such a dressing may be prepared as follows: First, one gallon of soft water, to which has been added six ounces of best extract of logwood, is heated nearly to the boiling-point, but preferably not brought to boil, and is well stirred until the dye-stuff is dissolved, after which it is allowed to cool; second, one gallon of soft water, to which has been added six ounces of borax, is likewise heated nearly to the boiling-point, until the borax is dissolved. To this is added one and one-half pound of gum-shellac, the same being gradually introduced in small quantities, and stirred briskly until thoroughly dissolved. Third, three-eighths of an ounce of bichromate of potash is dissolved in half a pint of hot water, in a separate vessel. This constitutes a proper mordant for converting the logwood extract into a black dye or soluble coloring matter, possessing a blue-black shade or tint, and having the properties hereinabove indicated. Fourth, the first and second preparations are now added together by pouring the logwood solution into the solution of shellac, and stirring well until the two are intermixed. Then, while yet warm, the solution of bichromate of potash is added, and the whole briskly stirred for some time. This mixture is allowed to stand until entirely cool, and then, after skimming off whatever may have risen to the top of it, the liquor is drawn off for use, and constitutes one form of the improved dressing belonging to this invention.

To make a dressing which may be applied to leather in very thin coats, and at the same time produce a finer and brighter finish than could otherwise be obtained, I mix with the liquor last hereinabove described three or four ounces of concentrated water of ammonia or spirits of ammonia, and then put it up in cans tightly corked, ready to be applied to the leather.

The dressing may be made thicker or thinner, as required.

I claim—

1. A leather dressing consisting of an alkaline solution of shellac and a black or nearly black soluble dye, substantially such as described.

2. A leather dressing consisting of an alkaline solution of shellac, a soluble coloring-matter capable of being held in the alkaline solution without precipitating the shellac and without being itself decomposed by the alkali, and ammonia, in addition to the alkali required for dissolving the shellac.

MELVIN SHAW.

Witnesses:

EDWD. H. FENNESSY,

L. H. LATIMER.